Jan. 12, 1943.                A. W. CHAPMAN                    2,307,877
           DEVICE FOR THE COMPARATIVE BALANCING OF GOLF CLUBS
                   AND OTHER IMPLEMENTS USED IN SPORT
                          Filed Oct. 28, 1940
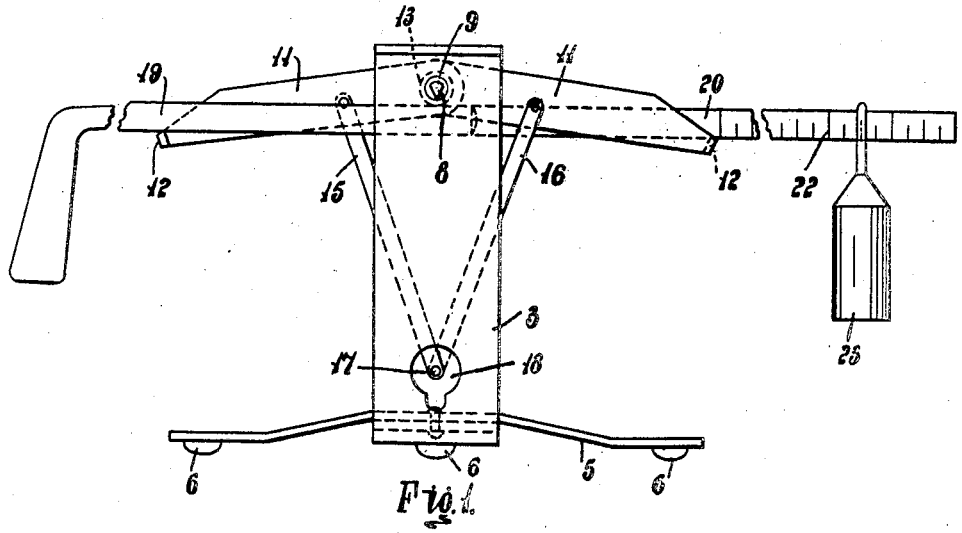
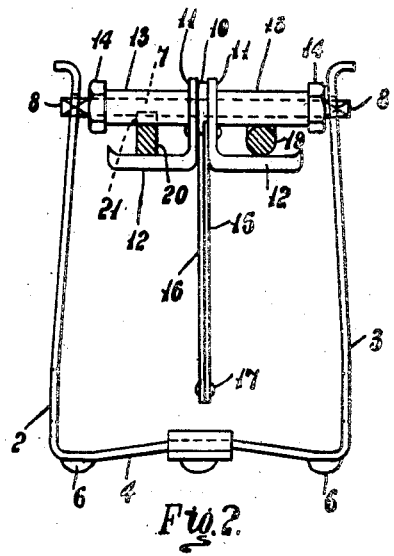
INVENTOR
A.W. CHAPMAN
BY
Kimmel & Crowell
ATTORNEYS Patented Jan. 12, 1943

2,307,877

UNITED STATES PATENT OFFICE 2,307,877

DEVICE FOR THE COMPARATIVE BALANCING OF GOLF CLUBS AND OTHER IMPLEMENTS USED IN SPORT

Arthur William Chapman, Putney, London, England

Application October 28, 1940, Serial No. 363,230
In Great Britain October 31, 1939

10 Claims. (Cl. 265—1)

This invention relates to balance devices of the kind used for the comparative balancing, in pairs, of golf clubs, tennis, squash and badminton racquets, hockey sticks, foils, swords, sculls, polo sticks and other implements or weapons used in sport or exercise, or other articles which are wielded by hand when in use. For simplicity of description, however, all such implements or weapons will be referred to hereinafter as sports implements, their shafts or handles as "shafts," and their heads or ends used in playing or exercising as "playing ends."

It is known that skill in playing golf or tennis, for example, depends to a considerable extent upon the playing balance of the clubs or racquets and that the best clubs or racquets should be balanced to fine limits. When renewing a golf club or a tennis racquet, for instance, a skilled player will insist upon having a duplicate of exactly similar balance or "feel." Calibrating instruments are known for indicating the weight of golf clubs on a dial.

One object of the present invention, however, is to provide simplified and inexpensive but accurate devices which will enable a user, or a prospective purchaser, to observe one club or racquet being balanced against another. Such visual comparison of balance is much more satisfactory than the observation of dial readings and is obviously more accurate than comparing balance by balance or "feel" in the hands.

A further object of the invention is to provide a balance device characterised by balance means adapted to compare the balance of the clubs or the like of a pair of golf clubs or the like, and to provide a visual indication of the comparative balance of the clubs or the like when they are held in the device at or near the position in which they would be held when used in play.

Such a device comprises rockably supported balance mechanism, which is adapted to support the shafts or handles of the pair of clubs or the like in juxtaposition, with the heads or the equivalent thereof projecting in opposite directions away from the centre of the balance mechanism, the condition of equilibrium of the latter thus furnishing a visual indication and comparison of the state of balance of the two clubs or the like.

It is obvious that it will be desirable so to construct the balance mechanism that it can be used to support clubs or the like having handles or shafts of different diameters or thicknesses. To this end, in a constructional form of the invention which is described hereinafter by way of example, the balance mechanism comprises a pair of balance arms adjustably and turnably carried on a fulcrum member, so that the vertical spacing between the latter and club or like supporting rests on the arms can be varied to accommodate clubs or the like having shafts or handles of different diameters or thicknesses. Means are also provided for permitting the adjustment of the arms and the retention thereof in their adjusted positions.

It is also of advantage to provide the device with means whereby the actual weight (as opposed to the balance weight) of a club or the like can be determined. In one construction, for example, such means consists of a weigh beam adapted to be removably supported upon the balance mechanism between the supporting rest on one of the balance arms and the fulcrum member.

One constructional form of the invention is shown, by way of example, on the accompanying drawing, whereupon:

Fig. 1 is an elevation of the device; and
Fig. 2 is an end view thereof.

The balancing device shown in the drawing is particularly adapted for the comparative balancing of golf clubs, although, as will be obvious from the following description, it can be used for the balancing of pairs of tennis and other racquets, hockey sticks, sculls, foils, polo sticks and other athletic implements or weapons, or articles which are wielded by hand when use.

The device comprises a U-shaped stand having up-standing limbs 2 and 3 and a base 4, to which latter is fixed a transverse plate 5. As shown in the drawing, rubber feet 6 are fixed to the underside of the base 4 and of the plate 5. The balance mechanism comprises a fulcrum pin 7, which is provided at each end with an knife-edge 8, the pin being rockably supported by the engagement of the knife-edges in co-axial holes 9 formed in the limbs 2 and 3.

Between the inner ends of the knife-edges, the pin 7 is screw-threaded, and substantially midway of its ends the pin is provided with a friction washer 10. The balance mechanism includes two balance arms 11, each of which consists of a plate of the shape shown in the drawing and each having an out-turned part or rest 12 at its outer end. Near its inner end, each balance arm is formed with a hole through which the pin 7 is passed when the device is being assembled. In the assembled position of the device, the rests 12 point in opposite directions as shown, and the arms 11 are held in position on the pin 7 and against relative movement thereto and between themselves by means of two tubular distance pieces 13. The arms are spaced by the friction washer 10, and pressure is applied to the distance pieces 13, to clamp the two arms in position against the friction washer, by means of nuts 14 screwed upon the pin 7 and breaking against the outer ends of the distance pieces.

In order to provide a balance indicator, the upper ends of the indicator arms 15 and 16 are jointed respectively to the balance arms 11, the lower ends of the indicator arms being connected by a joint pin 17, which acts as the balance indicator. Each of the limbs 2 and 3 is provided with a keyhole slot 18, through which the position of the indicator 17 can be viewed, and which can also be used when it is desired to suspend the device for use in the inverted position from a wall or elsewhere.

Assuming that the device is to be used for ascertaining the comparative balance of two golf clubs. Each of the clubs (one only is indicated on the drawing, at 19) is supported between a rest 12 and the underside of the corresponding distance piece 13, the grip of the club being arranged under the latter and the shaft on the top of the rest 12. The clubs thus project outwards in opposite directions from the fulcrum member. In one test, the clubs are moved longitudinally relatively to the fulcrum member until the balance mechanism is in equilibrium, this condition being readily determined by observing the position of the indicator 17 in one or the other of the holes 18. Knowing the position of his grip on the shaft of that club being used as the standard of comparison, and using the fulcrum member as a datum mark, the user can then note and, if desired, can mark on the shaft of the other club the position where he must grip in order that the two clubs shall be in balance in play.

In another test, the user arranges the two clubs on the device as described above, but with the ends of the shaft under the respective distance pieces 13, or at desired and equal distances from and on opposite sides of the common axis of said distance pieces. Assuming that the test shows that the two clubs are out of balance, the user adds additional weights to one of the clubs to restore balance. This can be done, for example, by putting coins on one of the club heads. According to his preference, the user can then either add an equivalent weight to the lighter club or he can reduce the weight of the other club.

It is convenient to provide the device with removable means whereby the actual weight, as opposed to the balance weight, of a club or the like can be determined. As shown in the drawing, such means may consist of a weigh beam 20 adapted to be supported from the balance mechanism between one of the rests 12 and one of the distance pieces 13, the weigh beam thus being held in position by its own weight. In order that the weigh beam may be arranged in its correct position on the balance mechanism, it may be provided with a V-shaped slot 21, with which the underside of the distance piece is engaged when the beam is in position. The beam is provided with graduations 22 and with a sliding weight 23.

The advantage of providing the device with angularly adjustable arms, such as the arms 11, will be obvious. For instance, in the device illustrated, it is possible to balance golf clubs with shafts of about ¾" diameter and tennis racquets with handles of about 1½" diameter and the range of adjustment can, of course, be made much greater than this.

A further important advantage of the device is that the adjustable arms 11 permit the centre of gravity of each of the two articles being compared to be brought just below the axis of the fulcrum, which renders the device much more sensitive than it would be if the centre of gravity were well below the said axis.

I claim:

1. A balance device of the kind referred to for testing sports implements, comprising, in combination, a fulcrum member adapted to be rockably carried by a support having a pair of limbs, a balance arm carried by said fulcrum member and projecting laterally on one side of the axis of the latter, another balance arm carried by the fulcrum member and projecting laterally on the opposite side of said axis, said arms being angularly adjustable relatively to the fulcrum member so that the device can be used to support implements having shafts of different thicknesses with the implements supported with their shafts in juxtaposition and held between the fulcrum member and said arms with their playing ends projecting in opposite directions, and means on said fulcrum member for fixing said arms in their adjusted positions.

2. A balance device of the kind referred to for testing sports implements, comprising, in combination, a fulcrum member adapted to be rockably carried by a support, a balance arm carried by said fulcrum member and adjustable about the axis thereof and projecting laterally on one side of the axis, said balance arm being provided at its outer end with a rest for supporting the shaft of one of the implements, said rest projecting in one direction from said arm, another balance arm carried by the fulcrum member and adjustable about the axis thereof and projecting laterally on the opposite side of said axis, said last mentioned arm being provided at its outer end with a rest for supporting the shaft of another implement, said rest projecting in the opposite direction from the first mentioned rest, and means for retaining the arms in their adjusted positions.

3. A balance device of the kind referred to for testing sports elements, comprising, in combination, a fulcrum member adapted to be rockably carried by a support, a balance arm carried by said fulcrum member and projecting laterally to one side of the axis of said member, another balance arm carried by the fulcrum member and projecting laterally on the opposite side of the fulcrum member, said arms being adjustably and turnably carried on the latter, a shaft-supporting rest on one of the balance arms, a shaft-supporting rest on the other balance arm, and the vertical spacing between the fulcrum member and said rests being variable to accommodate clubs having shafts of different thicknesses, and means for retaining the arms in their adjusted positions.

4. A balance device as claimed in claim 3, wherein the said means comprises a friction washer arranged on said fulcrum member between the balance arms, tubular distance pieces arranged on said fulcrum member each with one end in contact with a balance arm, and nuts screwed upon said fulcrum member and arranged to force the arms into contact with the friction washer by pressure applied to the outer ends of the tubular distance pieces.

5. A balance device as claimed in claim 1, wherein the said fulcrum member comprises a fulcrum pin provided at each end with a knife edge, and wherein the knife edges are rockably supported in holes formed coaxially in the limbs of said support.

6. A balance device as claimed in claim 1, comprising a balance indicator including a pair of indicator arms, one of which is jointed to one of the balance arms and the other to the other balance arm, and a joint member connecting the lower ends of the two indicator arms and forming the balance indicator, the position of which can be observed through a hole formed in a limb of said support.

7. A balance device of the kind referred to for testing sports implements, comprising a fulcrum member adapted to be rockably carried by a support, a weigh beam projecting from one side of said fulcrum member, a weight adjustably arranged on said weigh beam, and a balance arm carried by said fulcrum member and projecting in the opposite direction, from said member, and means whereby said arm may be adjusted angularly relatively to said fulcrum member and fixed in its adjusted positions so that club shafts of different thicknesses can be supported between said arm and said fulcrum member.

8. A balance device as claimed in claim 7, wherein the inner ends of two balance arms are adjustably carried by said fulcrum member, and wherein the weigh beam is removably supported between the outer end of one of said arms and said fulcrum member.

9. A balance device of the kind referred to for testing sports implements, comprising a support having spaced limbs, a fulcrum member rockably supported across said limbs, a balance arm supported for angular adjustment at its inner end on said member and projecting on one side of the axis of the latter, a second balance arm supported for angular adjustment at its inner end on said fulcrum member and projecting on the opposite side of the axis of the latter, means for fixing said arms in their adjusted positions, a shaft-supporting rest at the outer end of each of said arms, an indicator arm jointed at one end to one of said balance arms at a spaced distance from said fulcrum member, a second indicator arm jointed at one end to the other balance arm at an equal distance from said fulcrum member, and means for jointing the outer ends of said indicator arms together, at least one of said limbs having a hole therein whereby the position of the jointing means can be observed.

10. A balance device of the kind referred to for testing sports implements, comprising a fulcrum member adapted to be rockably mounted on a support, balance mechanism for furnishing a visual comparison, and indication of the state of balance of two sports implements and including two balance arms, one projecting in one direction and the other in the opposite direction from said fulcrum member, said arms being adapted to support the shafts of the two implements in juxtaposition with the playing ends projecting away from said member, and said arms being angularly and independently adjustable relatively to said fulcrum member, so that the balance of implements having shafts of different thicknesses can be compared by said device.

ARTHUR WILLIAM CHAPMAN.